US009768691B2

United States Patent
Ihs et al.

(10) Patent No.: US 9,768,691 B2
(45) Date of Patent: *Sep. 19, 2017

(54) INTEGRATED THERMAL AND POWER CONTROL

(71) Applicant: Endura Technologies LLC, San Diego, CA (US)

(72) Inventors: Hassan Ihs, Vendargues (FR); Taner Dosluoglu, New York, NY (US)

(73) Assignee: Endura Technologies LLC, San Diego, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/634,629

(22) Filed: Feb. 27, 2015

(65) Prior Publication Data

US 2016/0049862 A1 Feb. 18, 2016

Related U.S. Application Data

(63) Continuation of application No. 14/593,982, filed on Jan. 9, 2015.

(60) Provisional application No. 62/086,034, filed on Dec. 1, 2014, provisional application No. 62/037,065, filed on Aug. 13, 2014.

(51) Int. Cl.
| | |
|---|---|
| *H02M 3/156* | (2006.01) |
| *H02M 3/158* | (2006.01) |
| *H02J 4/00* | (2006.01) |
| *G05B 13/02* | (2006.01) |
| *H02M 1/32* | (2007.01) |

(52) U.S. Cl.
CPC .......... *H02M 3/158* (2013.01); *G05B 13/021* (2013.01); *H02J 4/00* (2013.01); *H02M 1/32* (2013.01)

(58) Field of Classification Search
CPC .... H02M 1/32; H02M 2001/327; H02M 3/04; H02M 3/156; H02M 3/157; H02M 2003/1566
USPC .......................... 323/222, 225, 271, 282–290
See application file for complete search history.

(56) References Cited

U.S. PATENT DOCUMENTS

| | | | |
|---|---|---|---|
| 4,870,528 A | 9/1989 | Harford | |
| 5,926,384 A | 7/1999 | Jochum et al. | |
| 6,028,755 A | 2/2000 | Saeki et al. | |
| 6,232,752 B1 | 5/2001 | Bissell | |
| 6,271,651 B1 * | 8/2001 | Stratakos et al. | 323/282 |

(Continued)

FOREIGN PATENT DOCUMENTS

| | | |
|---|---|---|
| JP | 2008-072872 A | 3/2008 |
| WO | WO 2004-006037 A2 | 1/2004 |

OTHER PUBLICATIONS

International Search Report on related PCT Application No. PCT/US2015/045141 from International Searching Authority (KIPO) dated Dec. 14, 2015.

(Continued)

*Primary Examiner* — Adolf Berhane
(74) *Attorney, Agent, or Firm* — Klein, O'Neill & Singh, LLP

(57) ABSTRACT

A switching power regulator provides for power regulation for a load, based at least in part on comparison of an output voltage with a reference voltage. The reference voltage may be changed, and in some cases changed dynamically, while regulated power is provided to the load. The switching power regulator may include a bypass switch for coupling ends of an output inductor.

4 Claims, 5 Drawing Sheets

(56) References Cited

U.S. PATENT DOCUMENTS

| | | | |
|---|---|---|---|
| 6,359,796 | B2 | 3/2002 | Hartular et al. |
| 7,692,416 | B2 | 4/2010 | Shimizu |
| 8,350,547 | B2 | 1/2013 | Ueno et al. |
| 2007/0096703 | A1* | 5/2007 | Jain ................................ 323/282 |
| 2008/0067998 | A1 | 3/2008 | Lee et al. |
| 2008/0272828 | A1* | 11/2008 | Min ......................... G01K 7/01 327/512 |
| 2008/0309608 | A1* | 12/2008 | Shen .................... G09G 3/3696 345/101 |
| 2009/0115388 | A1 | 5/2009 | Miyazaki et al. |
| 2010/0134078 | A1* | 6/2010 | Murakami et al. ........... 323/271 |
| 2012/0126770 | A1* | 5/2012 | Wang ..................... H02M 3/07 323/284 |
| 2012/0286576 | A1* | 11/2012 | Jing et al. ....................... 307/43 |
| 2013/0073240 | A1 | 3/2013 | Kameyama et al. |
| 2013/0335043 | A1* | 12/2013 | He et al. ....................... 323/234 |

OTHER PUBLICATIONS

Written Opinion on related PCT Application No. PCT/US2015/045141 from International Searching Authority (KIPO) dated Dec. 14, 2015.

\* cited by examiner

Lookup Table

| ID | $V_{REF}$ |
|---|---|
| 1 | $V_{ref}1$ |
| 2 | $V_{ref}2$ |
| ⋮ | ⋮ |
| N | $V_{ref}N$ |

FIG. 5

INTEGRATED THERMAL AND POWER CONTROL

CROSS-REFERENCE TO RELATED APPLICATIONS

This application is a continuation of U.S. patent application Ser. No. 14/593,982, filed Jan. 9, 2015, which claims the benefit of the filing date of (a) U.S. Provisional Patent Application No. 62/037,065, filed on Aug. 13, 2014, and (b) U.S. Provisional Patent Application No. 62/086,034, filed on Dec. 1, 2014, the disclosures of both of which are incorporated by reference herein.

BACKGROUND OF THE INVENTION

The present invention relates generally to power regulation for integrated circuits, and more particularly to adjustment of reference voltages during operation of a regulator control loop.

Integrated circuits generally require provision of power within particular parameters during operation. The provision of such power may face many complexities. For example, semiconductor chips including the integrated circuits may have different portions that require power at the same or different times, different portions may require power within different parameters, and some portions may utilize different amounts of power at different times. Complicating matters, some devices may be powered by batteries having relatively small capacities, while the devices themselves, at least at various times, may require large amounts of power.

In addition, integrated circuit operation may vary not only depending on power supply voltages, but also due to semiconductor process variations and operating temperatures. Modifying regulator operation to adjust for process and/or temperature may be difficult, however. For example, response time of such control may be overly very slow and may impact control loop stability and bandwidth of the regulator.

BRIEF SUMMARY OF THE INVENTION

Some aspects of the invention provide for voltage regulation of power domains, or islands within power domains, using voltage reference levels adjustable based on process and/or temperature variations and conditions. The voltage reference levels may be adjusted during operation of integrated circuitry within the power domains or islands, and may be adjusted during operation of a control loop of a regulator.

In some embodiments a regulator control loop includes information from process and temperature sensors. This information may used to directly adjust a reference voltage used for control loop operations, and in many embodiments allows for real-time response to PVT variations. In some embodiments this is done with regulators, which may include active transient control (ATC) blocks, having a fast transient response capable of providing multiple power domains independently, for example as discussed in U.S. Provisional Patent Application No. 62/012,909, filed Jun. 16, 2014, and entitled Transient Power Control, the disclosure of which is herein incorporated by reference for all purposes. With such regulators, in some embodiments, a very accurate and fast response to PVT variations that can even handle local variations within a System-on-Chip (SoC) may be provided.

In some embodiments adaptive voltage scaling (AVS) is used, with information from process sensors (SS, TT, FF process corners) used to adjust the voltage to optimize for power or for speed. Aspects of the invention provide real-time utilization of AVS within a regulator control loop by, for example, having dedicated sensors for voltage islands and adjusting reference voltage(s) during control loop operation based on information from the local sensors. In some embodiments, such operations may effectively integrate AVS within a voltage regulator control loop, provide for faster and fine power control, allow for reduced operating margins due to local variations. In some embodiments information from the local sensors are compared to information in a lookup table to determine target regulation voltages.

In some embodiments information from local process sensors is read, one or more voltage reference levels are adjusted, a switching power regulator control loop determines switching parameters and commands switch states based on one or more voltage comparisons with the reference voltage(s), with the foregoing thereafter repeated during operation of the integrated circuitry.

In some embodiments thermal control is also included by utilizing the information from temperature sensors. Thermal control may be used to provide for regulator operation in such a manner to avoid or minimize thermal shutdown. In some embodiments each voltage regulator has its own temperature sensors, and/or may be configured to support additional temperature sensors, for example to utilize both internal and external sensors. In some embodiments the voltage regulators use current information as an indication of temperature and/or in determining thermal margin. In some embodiments the voltage regulators use a prediction algorithm in which predicted current is an indication of temperature and/or thermal margin. In embodiments the voltage regulator holds or reduces supplied power to avoid thermal shutdown by, for example, adjusting voltage references and/or sending a command to lower clock frequencies.

In some embodiments a power regulation system, comprises: a controller configured to control power delivery to a load by controlling states of a first switch, second switch, and third switch of a power converter based on a voltage control signal, the first switch coupled across an output inductor, the second switch and third switch coupled in series between a higher voltage source and a lower voltage source, with one end of the output inductor coupled to a node between the second switch and the third switch; a power control unit configured to produce, including during operation of the first, second, and third switches, at least one reference voltage signal based on information from sensors; and a first comparator configured to produce the voltage control signal based on comparison of the reference voltage signal and a signal indicative of an output voltage of the output inductor.

In some embodiments a method for providing power regulation, comprises: performing switching of a switched power regulator to control delivery of power to a load, with switching of the switched power regulator based at least in part on comparison of a voltage applied to the load and a reference voltage; reading information from sensors relating to thermal conditions of the load; and adjusting, during performance of the switching of the switched power regulator, the reference voltage reference based on the information from the sensors.

These and other aspects of the invention are more fully comprehended upon review of this disclosure.

BRIEF DESCRIPTION OF THE FIGURES

FIG. 5 is a lookup table in accordance with embodiments of the invention.

DETAILED DESCRIPTION

Figure 1:
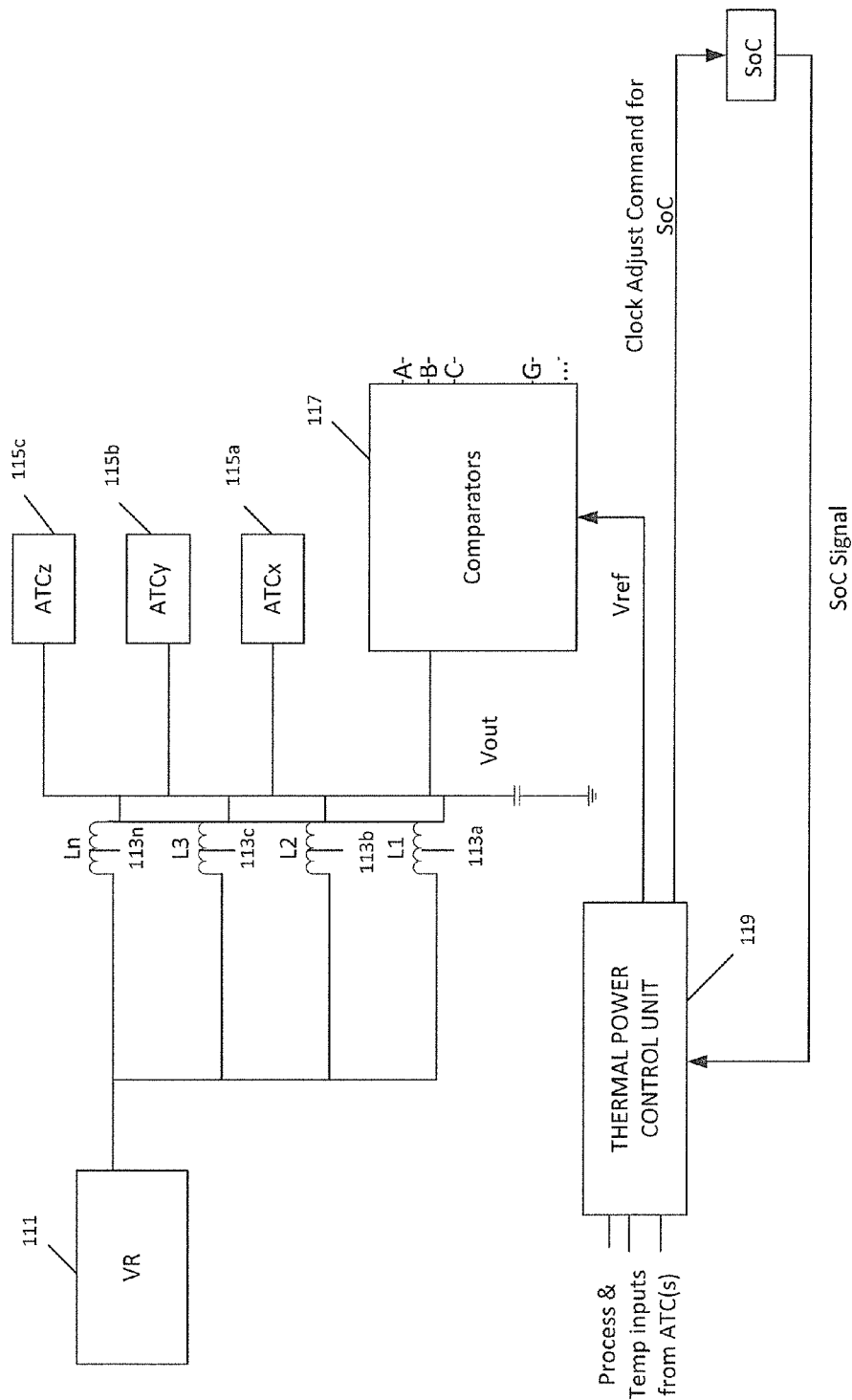
FIG. 1 is a block diagram of portions of a power regulation system in accordance with aspects of the invention.

FIG. 1 shows a block diagram of portions of a power regulation system in accordance with aspects of the invention. The system includes a voltage regulator 111. The voltage regulator provides for multi-phase control in the embodiment of FIG. 1, although in various embodiments single phase control may instead be provided. In some embodiments the voltage regulator regulates voltage of an output capacitor, with the voltage regulator in some embodiments providing signals to a phase control block (not shown in FIG. 1), for control of high side and low side switches for switchably connecting an end of an output inductor to a higher or lower voltage. An output inductor 113a-n is coupled to each phase of the voltage regulator. The voltage regulator may command coupling of the inductors to a higher or lower voltage in a switched manner, for example using pulse width and/or pulse frequency modulation techniques. In some embodiments a bypass switch (not shown) may also be coupled across each inductor. The bypass switches may also controlled by the voltage regulator, but in many embodiments is controlled by a corresponding active transient control block. In some embodiments the voltage regulators provide for multi-phase power regulation or a single phase controlling one or more power islands.

The inductors are coupled to a common output, which provides a voltage signal Vout. A plurality of active transient control (ATC) blocks 115a-c (as shown) are coupled to Vout. Each ATC block provides power to a particular power island within a power domain. In some embodiments, ATC blocks are not used, and may be replaced by other circuitry, or the power domain may itself form a single power island. In some embodiments each ATC controls the transient current increase of the parasitic inductance between the external capacitor and internal MIMCAP for a power island.

Operation of the voltage regulator depend on comparisons of Vout with one or more reference voltages, which for convenience shall simply be termed Vref, unless the context indicates otherwise. In the system of FIG. 1, the comparators for making the comparisons are provided in a comparator block 117. Outputs of the comparator block are provided to the voltage regulators (without such connections shown in FIG. 1 for clarity of the figure). In some embodiments the comparators include a plurality of comparators, each of which compares Vout to Vref or a scaled version of Vref. In some embodiments the voltage comparators are common to control of all phases of a power domain.

Figure 5:
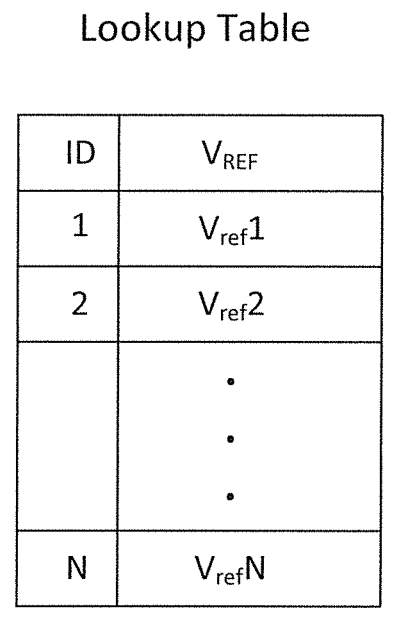

Vref is/are determined by a thermal power control unit or block 119. The thermal power control block receives process and temperature sensor outputs, from for example PVT sensors. In many embodiments the PVT sensors are located locally within the power domain and/or power islands served by the voltage regulator. In some embodiments the thermal power control block determines Vref through use of a lookup table, for example the lookup table of FIG. 5, with a position in the lookup table determined by values provided by the PVT sensors. In some embodiments different lookup tables may be used if, for example, an SOC requests power optimization or speed optimization.

In some embodiments the thermal power control block provides for adaptive voltage scaling (AVS) optimization for speed or power as thermal margin control for a given voltage domain connected to one or multiple power islands. In some embodiments the thermal power control block additionally receives information from the ATC blocks regarding power island current usage, with the thermal power control block utilizing this information for determining if adjustments should be made, for example increasing or decreasing Vref values, to avoid a situation in which thermal shutdown may be desired. In addition, in some embodiments the thermal power control unit may send a clock adjustment request to the SOC, for example to request lowering of clock frequencies to reduce power.

Figure 2:
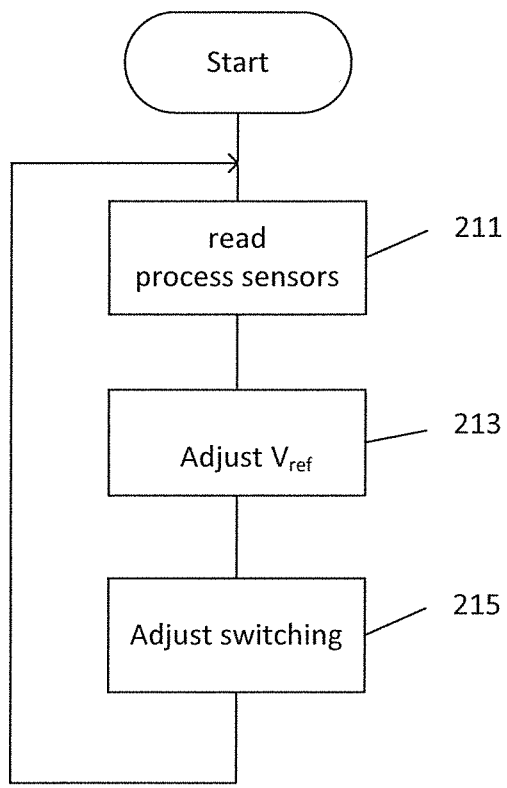
FIG. 2 is a flow diagram of a process for power regulation in accordance with aspects of the invention.

FIG. 2 is a flow diagram of process for providing power regulation for integrated circuitry. In some embodiments the process of FIG. 2 is performed by the system of FIG. 1. In some embodiments the process is performed by the thermal power control block and the voltage regulator of the system of FIG. 1. In many embodiments the process is performed during operations of a voltage regulator, while the voltage regulator is performing voltage control operations.

In block 211 the process reads information from PVT sensors. In some embodiments the PVT sensors are located in a particular power domain, or one or more power islands of a particular power domain. In some embodiments the PVT sensors are additionally or instead external to the power domain.

In block 213 the process adjusts one or more voltage reference values. In most embodiments the voltage reference values are used in determining switch states for power regulation. In most embodiments the voltage reference values are used for comparisons, for example by comparator circuitry, against an output voltage provided to a power domain or one or more power islands within a power domain.

In block 215 the process adjusts switching of a switched power regulator utilizing results of the comparisons with the voltage reference values. In some embodiments the process adjusts the switching by changing switch states of switches coupled to an output inductor. In some embodiments the process adjusts a duty cycle for power regulation, or adjusts a PFM frequency.

The process thereafter returns to block 211.

Figure 3:
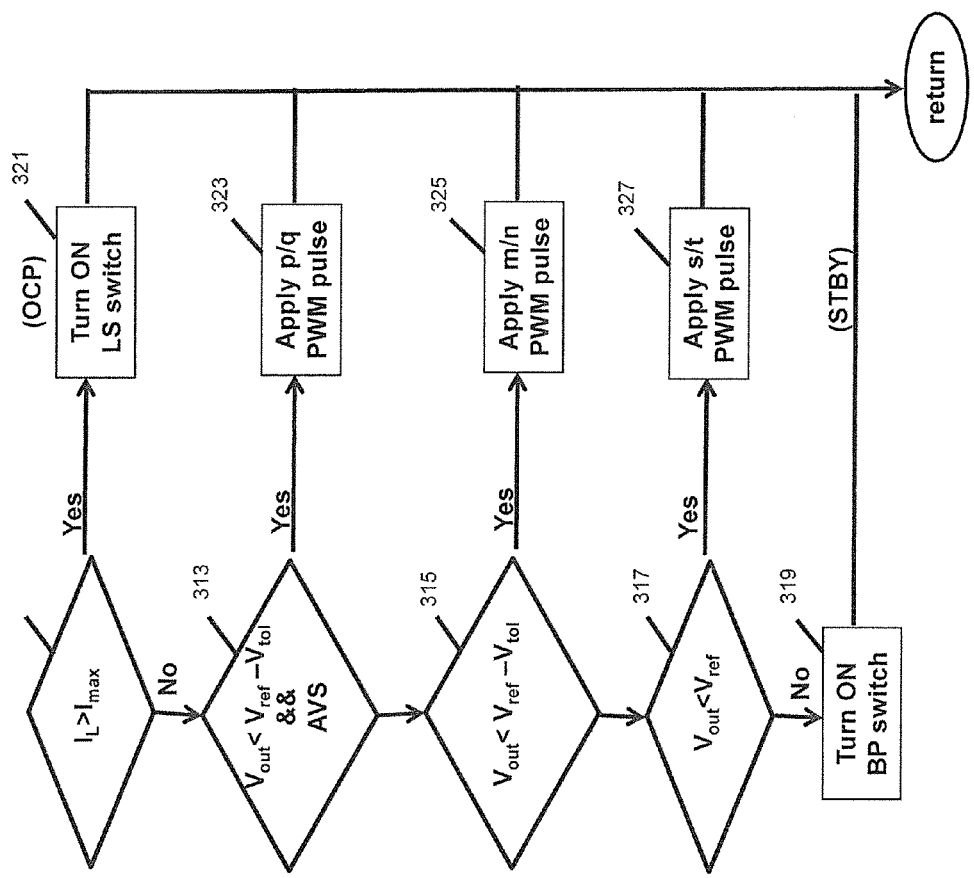
FIG. 3 is a flow diagram of details of portions of a process for power regulation in accordance with aspects of the invention.

FIG. 3 is a further flow diagram of a process in accordance with aspects of the invention. In some embodiments the process of FIG. 3 implements the operations of block 215 of the process of FIG. 2.

In block 311 the process determines if an inductor current, or estimate of inductor current in some embodiments, is greater than a predefined maximum inductor current. If so the process goes to block 321 and turns on a low side power regulation switch (and in most embodiments turns of a high side power regulation switch, if on). If not, the process continues to block 313.

In block 313 the process determines if output voltage is less than a reference voltage, minus a tolerance level, and automatic voltage scaling is active. If so, the process goes to block 323, and applies a first set of pulse width modulation pulses to the high side and low side power regulation switches. If not, the process continues to block 315.

In block 315 the process determines if the output voltage is less than the reference voltage, minus the tolerance level. If so, the process goes to block 325, and applies a second set of pulse width modulation pulses to the high side and low side power regulation switches. If not, the process continues to block 317.

In block 317 the process determines if the output voltage is less than the reference voltage. If so, the process goes to block 327, and applies a third set of pulse width modulation pulses to the high side and low side power regulation switches. If not, the process continues to block 319, and turns on a bypass switch, which for example may be coupled across an output inductor of an output inductor.

The process thereafter returns.

Figure 4:
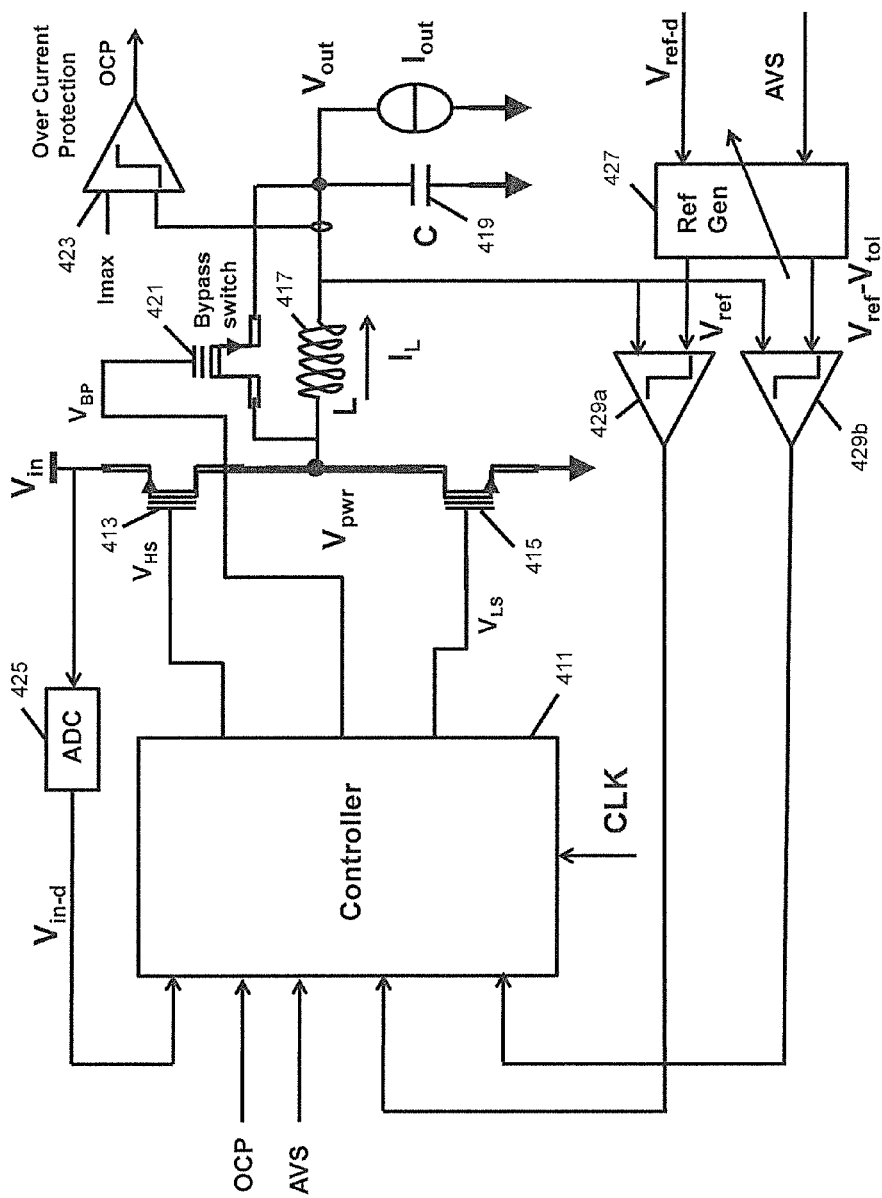
FIG. 4 is a semi-block diagram of a further power regulation system in accordance with aspects of the invention.

FIG. 4 is a semi-block diagram of a further power regulation system in accordance with aspects of the invention. The system of FIG. 4 includes a controller which determines switch states for a high side switch 413 and a low side switch 415 of the voltage regulator. In some embodiments the controller may operate in accordance with commands from a voltage regulator in a multi-phase environment, but in the embodiment of FIG. 4 the controller serves as a voltage regulator. The controller is implemented in some embodiments with integrated circuitry, with in some embodiments the integrated circuitry being a processor programmed to operate in accordance with program instructions. The high side switch has a first end coupled to power or some other higher voltage source, and a second end coupled to a first end of the low side switch. A second end of the low side switch is coupled to a ground or some other lower voltage level. An output inductor 417 has one end coupled to a node between the high side and low side switches, with an output capacitor 419 coupled to another end of the inductor. Vout is also taken from the other end of the inductor.

In the embodiment of FIG. 4, a bypass switch 421 is also provided across the inductor. The controller also determines state of the bypass switch in the embodiment of FIG. 4. In various embodiments, however, the bypass switch may instead be controlled by an active transient control block, which may also receive related commands from the controller in some embodiments.

The controller receives various commands and other information. For example, as indicated in the example system of FIG. 4, the controller receives, by way of an analog to digital comparator 425, an indication of a voltage supply level provided to the high side switch and, by way of a comparator 423, and indication of whether output inductor current is too high.

The controller also receives results of comparisons of the output voltage with reference voltages. The comparisons are performed by comparators 429*a-b*, in the example system of FIG. 4. The controller utilizes the results of the comparisons in determining states of the high side, low side, and bypass switches.

The reference voltages are determined by a reference voltage generator block, and the reference voltages may change during operation of the controller, and during operation of the high side, low side, and bypass switches. In some embodiments the reference voltage generator block may change the reference voltages without regard to operating state or status of the controller. In many embodiments the reference voltage generator block may change the reference voltages during operation of a control loop executed by the controller. In some embodiments the voltage generator block may change the reference voltages while the controller is commanding provision of power using pulse width modulation to regulate output power. In some embodiments the voltage generator block may change the reference voltages while the controller is commanding provision of power using pulse frequency modulation to regulate output power.

Although the invention has been discussed with respect to various embodiments, it should be recognized that the invention comprises the novel and non-obvious claims supported by this disclosure.

What is claimed is:

1. A power regulation system, comprising:
a controller configured to control power delivery to a load by controlling states of a first switch, second switch, and third switch of a power converter based on a voltage control signal, the first switch coupled across an output inductor, the second switch and third switch coupled in series between a higher voltage source and a lower voltage source, with one end of the output inductor coupled to a node between the second switch and the third switch and another end of the output inductor coupled to one end of an output capacitor;
a power control unit configured to adjust, including during operation of the first, second, and third switches, a reference voltage signal based on information from a temperature sensor;
a first comparator configured to produce the voltage control signal based on comparison of the reference voltage signal and a signal indicative of an output voltage of the output inductor; and
wherein the power control unit is configured to adjust the reference voltage signal based on information from the temperature sensor while the controller controls power delivery to the load; and
wherein the controller controls power delivery to the load by at least adjusting a duty cycle of the second and third switches;
wherein reference voltages are stored in a plurality of lookup tables, and the power control unit is configured to use the information from the temperature sensor to adjust the reference voltage signal by selecting a reference voltage from different lookup tables depending on whether power optimization or speed optimization is requested.

2. The power regulation system of claim 1, further comprising a second comparator configured to produce an over current protection (OCP) signal based on comparison of an indication of inductor current of the output inductor and a predefined inductor current.

3. The power regulation system of claim 2, wherein the controller is further configured to control states of the first switch, second switch, and third switch in response to the OCP signal and a second voltage control signal.

4. The power regulation system of claim 1, wherein another end of the output capacitor is coupled to the lower voltage source.

* * * * *